(12) United States Patent
Jones et al.

(10) Patent No.: US 8,263,030 B1
(45) Date of Patent: Sep. 11, 2012

(54) CONTROLLED IN-SITU DISSOLUTION OF AN ALKALI METAL

(75) Inventors: Jeffrey Donald Jones, Shelley, ID (US); Kirk John Dooley, Shelley, ID (US); David Donald Tolman, Idaho Falls, ID (US)

(73) Assignee: The United States of America as represented by the United States Department of Energy, Washington, DC (US)

( * ) Notice: Subject to any disclaimer, the term of this patent is extended or adjusted under 35 U.S.C. 154(b) by 10 days.

(21) Appl. No.: 13/041,765

(22) Filed: Mar. 7, 2011

Related U.S. Application Data

(60) Provisional application No. 61/311,714, filed on Mar. 8, 2010.

(51) Int. Cl.
*C01D 7/00* (2006.01)
(52) U.S. Cl. .................................. 423/201; 423/208
(58) Field of Classification Search ........... 423/180–208
See application file for complete search history.

(56) References Cited

U.S. PATENT DOCUMENTS

| 4,032,614 | A  | * | 6/1977 | Lewis | ........................... 423/179 |
| 5,678,240 | A  | * | 10/1997 | Herrmann | ........................ 588/18 |
| 6,175,051 | B1 | * | 1/2001 | Getman | ............................ 588/20 |
| 6,919,061 | B1 | * | 7/2005 | Sherman et al. | ............... 423/421 |

* cited by examiner

*Primary Examiner* — Steven Bos
(74) *Attorney, Agent, or Firm* — Michael J. Dobbs; Daniel Park; John T. Lucas (57) ABSTRACT

A method for the controllable dissolution of one or more alkali metals from a vessel containing a one or more alkali metals and/or one or more partially passivated alkali metals. The vessel preferably comprising a sodium, NaK or other alkali metal-cooled nuclear reactor that has been used. The alkali metal, preferably sodium, potassium or a combination thereof, in the vessel is exposed to a treatment liquid, preferably an acidic liquid, more preferably citric acid. Preferably, the treatment liquid is maintained in continuous motion relative to any surface of unreacted alkali metal with which the treatment liquid is in contact. The treatment liquid is preferably pumped into the vessel containing the one or more alkali metals and the resulting fluid is extracted and optionally further processed. Preferably, the resulting off-gases are processed by an off-gas treatment system and the resulting liquids are processed by a liquid disposal system. In one preferred embodiment, an inert gas is pumped into the vessel along with the treatment liquid.

20 Claims, 6 Drawing Sheets

CONTROLLED IN-SITU DISSOLUTION OF AN ALKALI METAL

RELATED APPLICATIONS

This U.S. non-provisional application claims priority to U.S. provisional patent application 61/311,714 filed Mar. 8, 2010, which is hereby fully incorporated by reference in its entirety.

GOVERNMENT INTERESTS

The United States Government has rights in this invention pursuant to Contract No. DE-AC07-05ID14516, between the U.S. Department of Energy (DOE) and CH2M-WG.

FIELD OF THE INVENTION

The present invention relates to the dissolution of one or more alkali metals. One preferred embodiment of the present invention is for the dissolution of sodium in a liquid metal cooled nuclear reactor.

BACKGROUND OF THE INVENTION

As a liquid metal cooled nuclear reactor or its components are being decommissioned, it is desirable to remove the metal coolant in a manner that is both safe to personnel and that also meets environmental regulations for both radioactive and hazardous wastes. To this end, it is common practice to utilize a two-phase approach of (1) removing the bulk of the metal coolant from the reactor and processing the removed coolant ex-situ in a treatment system that is physically separated from the reactor, and (2) treating the residual metal coolant in-situ in the reactor vessel.

With sodium and NaK metal coolants, treatment must be done with great care, due to both safety and environmental concerns. Sodium and NaK are highly chemically reactive, generating heat and pressure; moreover, their reaction products are typically chemically hazardous and/or flammable in air. Furthermore, their use in the high neutron flux fields of a reactor makes them radioactive and/or causes them to accumulate radioactive fission products. Many treatment approaches have been attempted to address these safety and environmental concerns.

For aqueous treatment of sodium, the chemical reaction at standard temperature and pressure can be written as $$Na(s) + H_2O(l) \rightarrow NaOH(s) + \tfrac{1}{2}H_2(g) \qquad (1)$$

When the reaction is conducted in air, the heat generated by reaction (1) can be sufficient to ignite the hydrogen reaction gas. Sodium hydroxide (NaOH) is a caustic solid that is hazardous to human tissues, including skin and eyes.

For sodium coolant, there are both non-aqueous and aqueous ex-situ treatments. As an example of a non-aqueous treatment, the two-step process of dissolving the sodium in anhydrous ammonia at elevated pressure (15-200 psi) and/or low temperature (−30° C.) to form alkali metal cations and solvated electrons, followed by adding a precipitating agent to combine with the alkali metal cations as taught by Getman in U.S. Pat. No. 6,175,051. Examples of aqueous treatments include the two-step process of injecting the sodium into hot (290° F.) caustic solution and further reacting the sodium hydroxide product with carbon dioxide and evaporating and solidifying the sodium bicarbonate product as taught by Herman in U.S. Pat. No. 5,678,240, and the injecting of sodium into hot caustic solution and then solidifying the caustic product as taught by Lewis in U.S. Pat. No. 4,032,614.

These non-aqueous and aqueous processes are not readily utilized for in-situ treatment of residual sodium, for reasons which include: (1) because the typical design of the nuclear reactor, reactor vessel, and/or its support systems do not support the processing chemistries, physical conditions and/or the equipment configurations required for these treatments, (2) because the two-step processes require at least two separate vessels, and are inherently therefore not suited to being performed in-situ and/or (3) because the process results in a hazardous substance as an intermediate and/or final product, making the process less than would be desired with regards to environmental regulations.

Treating sodium with a concentrated sodium hydroxide solution at room temperature has been found by the inventors to proceed slowly and relatively safely, but with the tendency to build up a white layer of solid material, presumably solid sodium hydroxide, and slow to the degree where the rate becomes undesirably low (as low as 2 mm of sodium depth reacted in 30 days). This slowing of the reaction rate as a consequence of increased concentration of reaction product at the sodium reaction surface is termed "liquid passivation".

A process previously taught by Sherman in U.S. Pat. No. 6,919,061 discusses reacting sodium with moist carbon dioxide gas to produce a surface layer of sodium bicarbonate, termed "gaseous passivation". This process is relatively safe but proceeds at a rate inversely proportional to the thickness of the sodium bicarbonate layer (ref. FIG. 7), and as a result the reaction becomes effectively self-limiting and undesirably incomplete in treating residual sodium that exists in thicker deposits.

Treating a sodium residue in-situ and relatively slowly (compared to aqueous treatment) with wet (water) vapor nitrogen and/or with wet (saturated) steam is known to start out proceeding in a relatively safe and controllable manner, but becomes undesirably uncontrollable, due to buildup of sodium hydroxide reaction product interposing at the interface between the sodium residue and the reactant gas. The sodium hydroxide reaction product tends to impede the reaction at the sodium interface, but at the gas interface and with continued treatment its hygroscopic nature attracts and condenses water, which builds up and then reacts suddenly and uncontrollably with underlying sodium when cracks develop in the interposing sodium hydroxide layer.

It is therefore the object of one embodiment of the present invention to provide the heretofore unattained benefits of safe and complete in-situ treatment of one or more alkali metals, without the generation of hazardous products as either intermediate or final products of treatment.

SUMMARY OF THE INVENTION

A method for the controllable dissolution of one or more alkali metals from a vessel containing a one or more alkali metals and/or one or more partially passivated alkali metals. The vessel preferably comprises a sodium, NaK, or other alkali metal-cooled nuclear reactor that has been used and therefore further comprises fission products (e.g. radioactive actinides, rare earth metals, etc.) The alkali metal, preferably sodium, potassium or a combination thereof, in the vessel is exposed to a treatment liquid, the treatment liquid comprising a neutralizer. Preferably, the treatment liquid is maintained in continuous motion relative to any surface of unreacted alkali metal with which the treatment liquid is in contact. Preferably, the neutralizer comprises water and a liquid reactant that reacts with the alkali metal and dissolves the alkali metal salt reaction product of the alkali metal. In one embodiment, the neutralizer comprises water, an aliphatic alcohol and/or other liquid reactant that is capable of both reacting with alkali metal as well as dissolving the alkali metal salt reaction product. In a preferred embodiment, the neutralizer comprises an acidic liquid.

The treatment liquid is preferably pumped into the vessel containing the one or more alkali metals and the resulting fluid is extracted and optionally further processed. Preferably, the resulting off-gases are processed by an off-gas treatment system and the resulting liquids are processed by a liquid disposal system. In one preferred embodiment, an inert gas is pumped into the vessel along with the treatment liquid,

DETAILED DESCRIPTION OF THE INVENTION

A method for the controllable dissolution of one or more alkali metals from a vessel containing a one or more alkali metals and/or one or more partially passivated alkali metals. The vessel preferably comprises a sodium, NaK, or other alkali metal-cooled nuclear reactor that has been used and therefore further comprises fission products (e.g. radioactive actinides, rare earth metals, etc.) The alkali metal, preferably sodium, potassium or a combination thereof, in the vessel is exposed to a treatment liquid, the treatment liquid comprising a neutralizer. Preferably, the treatment liquid is maintained in continuous motion relative to any surface of unreacted alkali metal with which the treatment liquid is in contact. Preferably, the neutralizer comprises water and a liquid reactant that reacts with the alkali metal and dissolves the alkali metal salt reaction product of the alkali metal. In one embodiment, the neutralizer comprises water, an aliphatic alcohol and/or other liquid reactant that is capable of both reacting with alkali metal as well as dissolving the alkali metal salt reaction product. In a preferred embodiment, the neutralizer comprises an acidic liquid.

The treatment liquid is preferably pumped into the vessel containing the one or more alkali metals and the resulting fluid is extracted and optionally further processed. Preferably, the resulting off-gases are processed by an off-gas treatment system and the resulting liquids are processed by a liquid disposal system. In one preferred embodiment, an inert gas is pumped into the vessel along with the treatment liquid, In one embodiment, a treatment liquid is delivered in a controlled manner so that any gases and/or heat generated by a chemical reaction between the treatment liquid and one or more alkali metals are released in a manner that avoids pressure and temperature increases to the extent that might risk rupturing or otherwise breaching the integrity of the vessel, avoids buildup of interposing solid reaction product layers and/or dissolves pre-existing solid reaction product layers, and when the treatment liquid is reacted with the one or more alkali metals and other contents of the vessel, produces a reaction product that meets the criteria for non-hazardous chemical waste, preferably having a pH ranging from between 2 and 12.5.

FIG. 1

Figure 1:
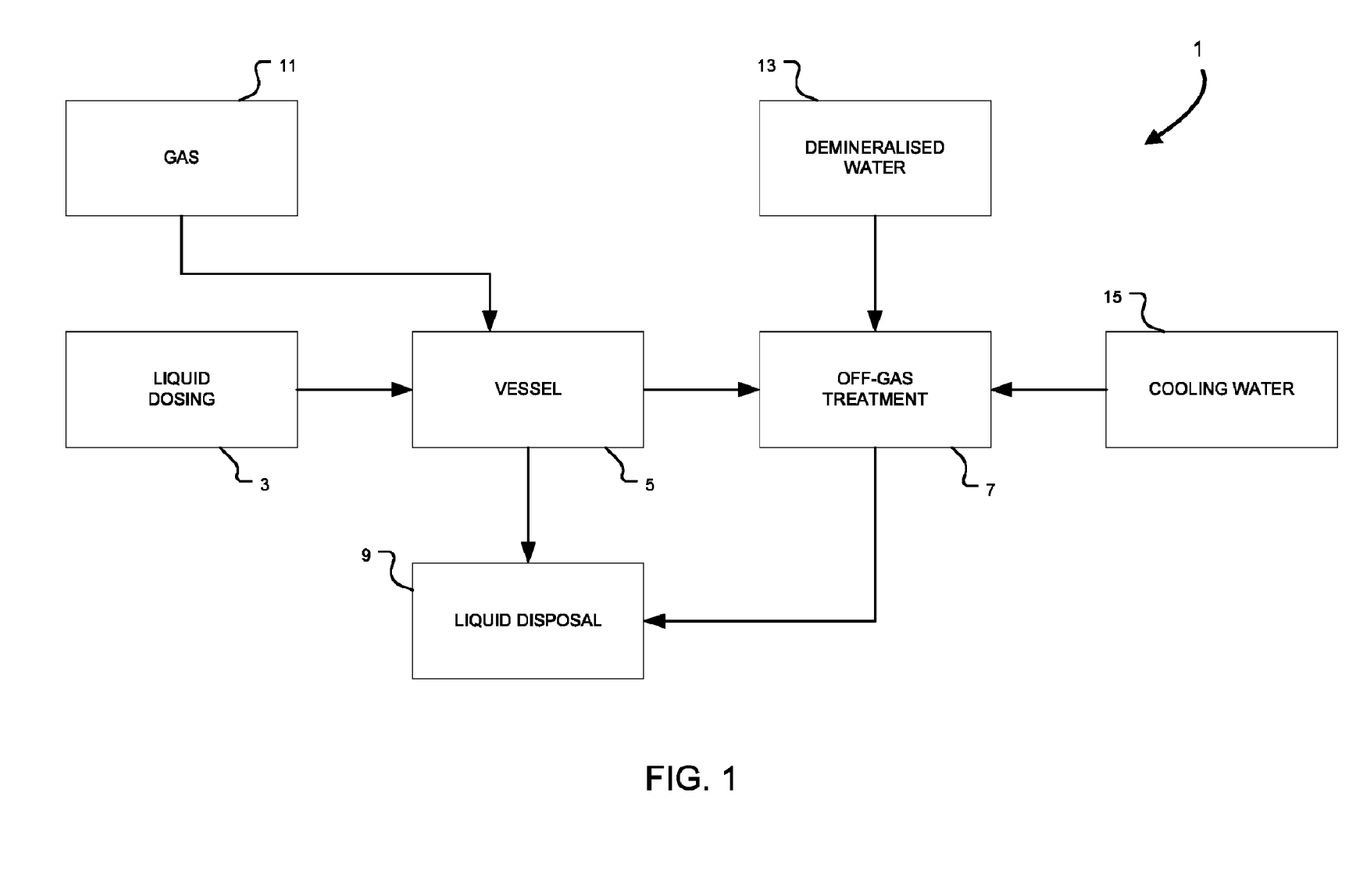
FIG. 1 depicts a general overview of one embodiment of an alkali metals treatment system.

FIG. 1 depicts a general overview of one embodiment of an alkali metal treatment system 1 comprising a vessel 5 containing residual one or more alkali metals to be treated in-situ. In an alternative embodiment, the vessel 5 comprises sodium, NaK, potassium, and/or other alkali metals. As will be described in greater detail below, a treatment liquid is delivered into the vessel 5 by means of a liquid dosing system 3, under an inert gas delivered by an inert gas system 11, and with gases both produced in and passed through the vessel 5 being exhausted to an off-gas treatment system 7. A reaction product, which is the result of the chemical reaction between and physical mixing of the treatment liquid with one or more alkali metals and possibly other contents of vessel 5, is removed from vessel 5 and sent to a liquid disposal system 9. In a preferred embodiment, both a demineralized water delivery system 13 and a cooling water delivery system 15 provide water for use by off-gas treatment system 7.

The Vessel 5

The vessel 5 is any vessel comprising one or more alkali metals, preferably sodium. The vessel 5 may comprise a tank, piping and/or one or more alkali metal-bearing components. Preferably, the vessel 5 comprises a primary alkali metal circulation system utilized in one or more steps of the transfer of heat from a nuclear reactor to an electrical generator (e.g., steam generator). In an alternate embodiment, the vessel 5 comprises a primary alkali metal circulation system and a secondary alkali metal circulation system utilized in one or more steps of the transfer of heat from a nuclear reactor to an electrical generator (e.g., steam generator). Preferably, the primary alkali metal circulation system draws thermal energy in the form of heat away from the nuclear reactor and comprises a primary vessel, a reactor core, and a primary circulation pump. If a secondary alkali metal circulation system is also utilized, preferably an intermediate heat exchanger is also employed to transfer heat from the primary circulation system to the secondary circulation system. The secondary alkali metal circulation system, if utilized, preferably comprises a secondary alkali circulation pump, steam evaporators, steam superheaters, a surge tank, and/or a secondary alkali metal drain tank. The primary and secondary alkali circulation systems may also comprise alkali-metal-containing components and/or piping contained therein and/or communicating therewith. The Experimental Breeder Reactor II (EBR-II) at the Materials and Fuels Complex at Idaho National Laboratory, which is currently undergoing decontamination and decommissioning, is one example of a vessel 5.

Liquid Dosing System 3

The liquid dosing system 3 provides a treatment liquid for dissolving alkali metal within the vessel 5. Preferably, the liquid dosing system 3 comprises one or more tanks of a neutralizer (see FIG. 2). In one embodiment, the liquid dosing system 3 comprises a liquid pump, preferably driven by an electromagnetic motor. In a preferred embodiment, the liquid dosing system 3 comprises a pump in combination with a variable speed drive, a flow meter, a check valve and a solenoid valve, which in combination provide uni-directional, precise dosing capability of the treatment liquid to the vessel 5. In a preferred embodiment, liquid dosing system 3 also provides a means for readily varying the concentration of aqueous, acidic liquid in the treatment liquid delivered to vessel 5.

Figure 3A:
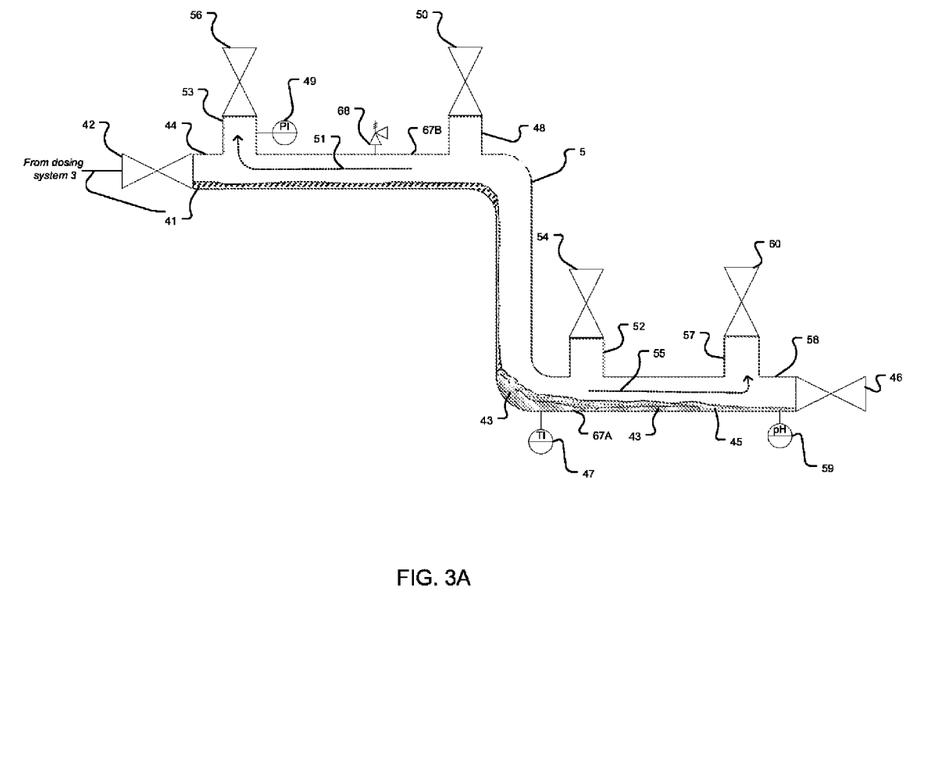
FIG. 3A depicts a first step of one embodiment of the invention wherein the vessel to be treated has a relatively clear treatment path.

Preferably, the liquid dosing system 3 delivers the treatment liquid to a lower section of the vessel 5 (for example 67A in FIG. 3A). As the vessel 5 fills with the treatment liquid, gases (ambient air, any gases already existing in the vessel 5, inert gas, or reaction product gas, or any other gas) is preferably vented through one or more vents. Preferably, once the gases in the lower section of the vessel 5 are vented, the one or more vents in the lower section of the vessel 5 are closed. Preferably, about all gases are vented out of the vessel 5 and the treatment liquid fills the entire lower section of the vessel 5.

Preferably, liquids within the vessel 5 are in maintained in continuous motion relative to any surface of unreacted alkali metal with which the treatment liquid is in contact in order to prevent the buildup of reaction products, which buildup of reaction products prevent the controlled dissolution of the alkali metal. The buildup of reaction products, for example sodium hydroxide, is particularly dangerous as it will prevent the controlled reaction of the alkali metal, for example if an incompletely reacted portion of alkali metal becomes submerged within a section of vessel 5 and the section becomes filled with liquid, the sudden reaction of the previously incompletely reacted portion of alkali metal generates pressure that is not readily dissipated in a submerged condition, thus generating localized pressure that might cause an unwanted breach of vessel 5, releasing hazardous and potentially explosive gases into the surrounding area. In one embodiment, the liquid dosing system 3 provides the treatment liquid within the vessel 5 in a continuous fashion whereby fluid in the vessel 5 is maintained in maintained in continuous motion. In a preferred embodiment, an inert gas is delivered into the lower section of the vessel 5. Delivering an inert gas into the lower section of the vessel 5 before the entire lower section of the vessel 5 has been substantially filled with the treatment liquid may be preferable as it will help sweep away any reactive gases. For example, the hydrogen concentration in the gas(es) within vessel 5 is preferably reduced to levels below 4% by volume (the lower explosion limit of hydrogen in air) near the end of treatment in order to reduce the potential for explosion after the treated system is in communication with air. More preferably, the hydrogen concentration is reduced to levels below 1% by volume near the end of treatment. Preferably, the inert gas is delivered into the lower section of the vessel 5 after the entire lower section of the vessel 5 has been substantially filled with the treatment liquid, as the inert gas will aid in the stirring the liquids near any residual alkali metal remaining in the vessel 5. Preferably, gases are vented in an upper section of the vessel 5, until the entire vessel 5 is filled with the treatment liquid. Once the entire vessel 5 has been filled with the treatment liquid, and the treatment liquid and any alkali metal in the vessel 5 have sufficiently reacted, the treatment liquid is extracted.

The Neutralizer

The neutralizer supplied by the liquid dosing system 3 comprises a liquid reactant that is capable of reacting with alkali metal, producing a reaction product, and dissolving the reaction product. Preferably, the reaction product comprises an alkali metal cation and an anion and has a pH of less than 12.5. In one embodiment, the neutralizer comprises aqueous acid. In one embodiment, the neutralizer comprises water and liquid reactant. Preferably, the liquid reactant comprises one or more aqueous acids, an aliphatic alcohol, salt of an acid, or a combination thereof. In a preferred embodiment, the liquid reactant comprises (sulfuric acid and sodium sulfate), (acetic acid and sodium acetate), (citric acid and sodium citrate), or combinations thereof. In yet another alternate embodiment, the neutralizer comprises one or more liquid reactants that are capable of reacting with alkali metal as well as dissolving an alkali metal salt reaction product. In a preferred embodiment, the neutralizer comprises an aqueous acid and/or a salt of an acid. Preferably, the aqueous acid and salt is sulfuric acid and sodium sulfate, acetic acid and sodium acetate, citric acid and sodium citrate, or combinations thereof.

In one embodiment, the neutralizer comprises water and a dissolved acid, a dissolved buffer (acid and salt), or a combination thereof. Preferably, the dissolved buffer is (sulfuric acid and sodium sulfate), (acetic acid and sodium acetate), (citric acid and sodium citrate), or a combination thereof. In a preferred embodiment, the neutralizer comprises an acetic acid and acetic acid/sodium acetate buffer of about (total acid plus salt concentration) 0.2 to 4.0 moles per liter, with a preferred range of 0.6 to 2.0 moles per liter.

The preferred embodiment of the neutralizer employs citric acid, due to its being triprotic, its low corrosivity, and its having relatively neutral pKa's (3.1, 4.8 and 6.4). Preferably, the citric acid is introduced into the vessel 5, either alone or in combination with its salt, at a concentration of from about (total acid plus salt concentration) 0.1 to 3.0 moles per liter, and preferably at a concentration of about 0.5 to 1.5 moles per liter.

Neutralizers that contain citric acid and/or buffer concentrations preferably are no less dilute than about 0.1 moles per liter, in order to avoidan undesirably large quantity of neutralizer to obtain a reaction product pH that is in the environmentally desired range that would categorize the reaction product as non-hazardous. For example, one preferred embodiment at EBR-II results in a reaction product pH that is from between 2 and 12.5, which range qualifies environmentally as non-hazardous from a chemical standpoint (radioactivity issues aside). Neutralizers that contain citric acid and/or buffer concentrations preferably have citric acid concentrations less than about 3.0 moles per liter, in order to avoid an undesirably large amount precipitation of solids in the reaction product, which are undesirable from the standpoint that they complicate removal of chemical reaction products and also from the standpoint that they tend to interfere with liquid flow, increasing the risk of the previously mentioned liquid reaction passivation.

Inert Gas System 11

The inert gas system 11 provides one or more inert gases to the vessel 5 to reduce the concentration of flammable gases and/or explosive mixtures of gases. In one embodiment, the inert gas system 11 is a gas cylinder. In a preferred embodiment, the inert gas system 11 is a cryogenic Dewar with an evaporator, which in tandem provide inert gas to the vessel 5 of the alkali metal treatment system 1. Preferably, the inert gas system 11 provides nitrogen, argon, or a combination thereof. In a preferred embodiment, the inert gas system 11 provides nitrogen.

Off-Gas Treatment System 7

The off-gas treatment system 7 processes any reaction gases resulting from the reaction between the treatment liquid and contents of the vessel 5. For example, in the preferred embodiment, where the one or more alkali metals is sodium, the off-gas treatment system 7 processes sodium and/or sodium bicarbonate, and suspended solids including sodium hydroxide generated by the reaction of the sodium metal with the treatment liquid, as well as the inert gases introduced and passed through the vessel 5. Preferably, the off-gas treatment system 7 provides safety for personnel in the vicinity of alkali metal treatment system 1 by removing hazardous chemicals such as sodium hydroxide and/or radioactive particles, preferably by means including, but not limited to, scrubbing and/or filtering the off-gas stream leaving the vessel 5 during alkali metal treatment. Preferably, the off-gas treatment system 7 comprises a means for reducing the off-gas temperature, including, but not limited to, one or more heat exchangers, as well as a cooling fluid, preferably a cooling water stream delivered by cooling water system 15. Preferably, the off-gas treatment system 7 comprises a demineralized water stream from the demineralized water delivery system 13 for use in the scrubbing means.

Liquid Disposal System 9

The liquid disposal system 9 of FIG. 1 provides for removal of the reaction product resulting from the chemical reaction between and physical mixing of the treatment liquid with alkali metal and possibly other contents of the vessel 5, and preferably comprises a pump and piping. In one embodiment, the liquid disposal system 9 comprises a disposal means including, but not limited to, evaporators, tanker trucks, mixers, oxidation and/or other reactors, and/or filter beds.

Demineralized Water Delivery System 13

The demineralized water delivery system 13 of a preferred embodiment of alkali metal treatment system 1 provides for the supply of water containing limited concentrations of dissolved solids to off-gas treatment system 7, and may comprise a deionized water ion exchange system or a reverse osmosis purification system.

Cooling Water Delivery System 15

The cooling water delivery system 15 of another preferred embodiment of alkali metal treatment system 1 provides for delivery of cooling water to be utilized by off-gas treatment system 7 for the removal of heat from the off-gas stream leaving the vessel 5 during alkali metal treatment. The cooling water temperature is preferably reduced by means of a chiller system which may comprise or include an evaporating tower, a refrigerant loop, and/or using a relatively cool underground water supply.

FIG. 2

Figure 2:
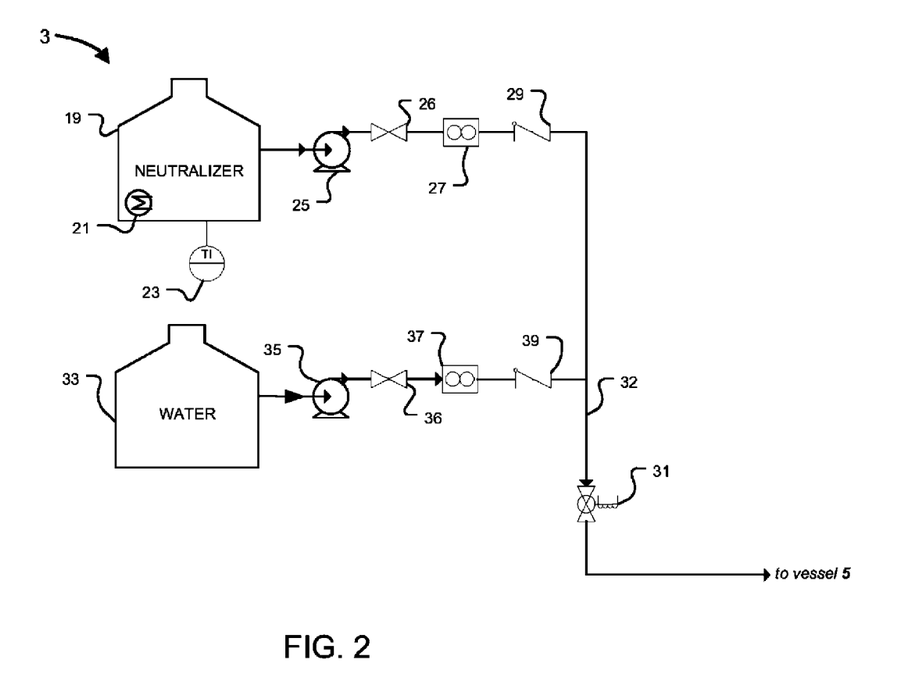
FIG. 2 depicts a preferred embodiment of the liquid dosing system shown in FIG. 1.

With reference to FIG. 2, further details are depicted of one embodiment of the liquid dosing system 3 shown in FIG. 1. As shown in FIG. 2, the liquid dosing system 3 comprises a neutralizer supply tank 19, a neutralizer delivery pump 25, a neutralizer flow meter 27, and a neutralizer check valve 29. Preferably, the neutralizer is a neutralizer as described above. In a preferred embodiment, the neutralizer comprises water and an acid. In a preferred embodiment, the neutralizer comprising water and an acid dynamically mixed with a second stream of water to provide a treatment liquid as depicted by treatment liquid stream 32 and the system additionally comprises a water supply tank 33, a water delivery pump 35, a water flow meter 37 and a water check valve 39.

In the alternative, for embodiments whereby the alkali metal is sodium, the neutralizer comprises water and the neutralizer is delivered into vessel 5 of FIG. 1 at a volume ratio to sodium of least about 1335:1.

The Neutralizer Supply Tank 19

The neutralizer supply tank 19 contents comprise water as an alkali metal reactant, but may also comprise for example, but not limited to, ethanol, other aliphatic alcohols, or other liquids commonly used in the treatment of residual alkali metal. In one embodiment, the neutralizer comprises water and a dissolved acid, a dissolved buffer (acid and salt), or a combination thereof.

The preferred embodiment of the neutralizer in the neutralizer supply tank 19 employs citric acid, due to its being triprotic, its low corrosivity, and its having relatively neutral pKa's (3.1, 4.8 and 6.4). The citric acid is introduced into the vessel 5 of FIG. 1 at a concentration of from about 0.1 to 3.0 moles per liter, and preferably at a concentration of about 0.5 to 1.5 moles per liter.

As further depicted in FIG. 2, the preferred embodiment of liquid dosing system 3 also includes heater 21 and neutralizer temperature indicator 23, which are used to control the temperature of the neutralizer solution. This temperature control is advantageous not only from the standpoint of consistently obtaining desired reaction times during treatment of alkali metal, but also from the standpoint of detecting zones of unreacted, reacting or cleared alkali metal as will be described later in conjunction with FIG. 3.

As further depicted in FIG. 2, liquid dosing system 3 also preferably includes neutralizer flow control valve 26, flow meter 27 and solenoid valve 31, which in combination with neutralizer supply tank 19 and neutralizer delivery pump 25, are used to deliver both a controlled flow rate and dose duration and/or volume of neutralizer to the vessel 5 of FIG. 1. In a preferred embodiment, the neutralizer delivery pump 25 comprises a centrifugal pump, and the neutralizer flow meter 27 also includes a totalizing capability, either within neutralizer flow meter 27 or in combination with other equipment (e.g., electronic computation device). Alternative means for delivering controlled doses of neutralizer, such as using a positive displacement pump in place of neutralizer delivery pump 25 and solenoid valve 31 may also be utilized. The preferred embodiment also includes neutralizer check valve 29, which is used to prevent backflow of reaction product, along with any radioactive contents, towards neutralizer supply tank 19.

The Water Supply Tank 33

The preferred embodiment also comprises, as depicted in FIG. 2, an additional water supply means. In this embodiment, a water supply tank 33 provides water to be mixed with the neutralizer solution to provide a premixed treatment liquid to be delivered to vessel 5 of FIG. 1. With functions and alternatives similar to those described above for neutralizer delivery, the apparatus preferably includes water delivery pump 35, water flow control valve 36, water flow meter 37 and water check valve 39. This water supply means allows the benefit of readily altering the acid concentration of the treatment liquid, for example by varying the ratio of flow of acid as measured by utilization of flow meter 27 and delivered by neutralizer delivery pump 25 to vessel 5 of FIG. 1, the which concentration altering may be advantageous due to varying circumstances, including varying alkali metal to volume ratio encountered in vessel 5 of FIG. 1.

For a vessel 5 of FIG. 1 that has very small amounts of residual alkali metal in proportion to the volume of vessel 5 of FIG. 1, which alkali metal may reside not only on the vessel floor but also on the walls and on the inside of the top of vessel 5 of FIG. 1, preferably, a treatment liquid of relatively low acid concentration is used, since only a relatively small amount of acid is required to obtain the desired pH in the reaction product. For a vessel 5 of FIG. 1 that still has a substantial quantity of residual alkali metal, preferably, a treatment liquid of relatively high acid concentration is used, whereby it both provides for completely reacting with the residual alkali metal and also in that it provides for a relatively low volume of reaction product.

FIG. 3A

With reference to FIG. 3A, further details are depicted of one embodiment of the vessel 5 shown in FIG. 1. For this embodiment, the treatment flow path, defined as the path liquid takes between a point where treatment liquid is introduced into vessel 5 and a point from which reaction product is removed from vessel 5, is relatively unobstructed. In a preferred embodiment, treatment liquid 41 is metered, dosed and/or otherwise controlled so that the ratio of the reactive surface area to minimum vessel cross-sectional area is less than unity, the ratio being defined as the area of contact between residual alkali metal 43 and treatment liquid 41 within vessel 5 at any given time during treatment of the residual alkali metal 43 to the minimum cross-sectional area of vessel 5 along and normal to the treatment flow path, the ratio preferably being less than 90%, and the ratio being preferably less than 50%, and the ratio being most preferably less than 10%.

A treatment liquid 41 is delivered to vessel 5, which is depicted for this embodiment as a pipe with bends, including a lower section 67A and an upper section 67B. The treatment liquid 41 contacts and reacts with residual alkali metal 43, said reaction generating both reaction product 45 and an off-gas stream depicted by a first gas flow arrow 51, which follows the path of least resistance and exits the vessel 5 via a first gas vent 53 that communicates with off-gas treatment system 7 of FIG. 1. Preferably a second gas vent 57 is further provided that also communicates with off-gas treatment system 7 of FIG. 1, allowing for exhaust of a second off-gas stream as depicted by a second gas flow arrow 55 via the second gas vent 57. Preferably, a pressure relief device, depicted as pressure relief 68 is provided in communication with vessel 5 and in communication with relief vent piping (not shown) for the purpose of protecting vessel 5 from overpressure and for venting relief effluent to the atmosphere at a safe distance from personnel and equipment.

By means of monitoring physical parameters of the chemical reaction between the treatment liquid 41 and the residual alkali metal 43, feedback is provided for controlling the treatment liquid 41 dose volume and/or flow rate. Flow of treatment liquid 41 into vessel 5 is controlled by manipulation of liquid inlet valve 42, which is in communication with vessel inlet 44, and in combination with manipulation of neutralizer delivery pump 25, neutralizer flow control valve 26 solenoid valve 31 and utilizing feedback from neutralizer flow meter 27, and also preferably by manipulation of water delivery pump 35, water flow control valve 36 and utilizing feedback from water flow meter 37.

In an alternative embodiment, a means comprising an auxiliary pump (not shown) and additional piping and valve(s) are utilized for recirculating reaction product 45 from vessel outlet 58 to be combined with or reused as treatment liquid 41. Flow of reaction product 45 leaving vessel 5 and to disposal system 9 of FIG. 1 is controlled by preferably utilizing liquid drain valve 46 either in combination with gravity or in combination by providing a liquid drain pump (not shown) that is in communication both with a vessel outlet 58 of vessel 5 and also with disposal system 9 of FIG. 1.

Feedback utilized to control the flow and/or dose of treatment liquid 41 into and out of vessel 5 is provided by utilizing measured parameters that include but are not limited to additional items represented in FIG. 3A, such as a vessel temperature indicator 47, a vessel pressure indicator 49, pH indicator 59 and/or measurements of additional parameters provided by other means such as a conductivity meter, an electrochemical cell, an acoustic noise indicator, a vibration indicator, and/or a spectral imaging indicator (not shown). Other feedback parameters utilized for controlling delivery of treatment liquid 41 are measured in off-gas treatment system 7 of FIG. 1 and will be discussed below in connection with FIG. 4.

Preferably, the vessel temperature indicator 47 is a thermocouple, a thermistor, a light (e.g. laser) based temperature probe, a sound (e.g. ultrasound) based temperature probe, variants thereof, or a combination thereof. Preferably, the vessel temperature indicator 47 comprise an infrared camera with video display, whereby individuals or automated equipment controlling the flow of treatment liquid 41 to vessel 5 can readily detect contact of treatment liquid 41 with the walls of vessel 5 (due to the local differences in surface temperature of vessel 5 caused by differences between the temperatures of treatment liquid 41 and vessel 5), flow blockages within vessel 5 (due to the blockage of flow by and/or diversion of treatment liquid 41 around obstacles as observed by temperature patterns on the external surface of vessel 5), and/or zone (s) of chemical reactions of treatment liquid 41 with residual alkali metal 43 (by heat generated at the reaction interface transferring to the exterior walls of vessel 5).

Changes in values indicated by the vessel temperature indicator 47, vessel pressure indicator 49, and/or pH indicator 59 may all be utilized to assess the location(s) of reaction, the location of the treatment liquid 41 within vessel 5, the rate of reaction and/or the degree of completion of the reaction of the residual alkali metal 43 with treatment liquid 41.

Also depicted in FIG. 3A, in one embodiment, the handling of gases into, through and out of vessel 5 is provided for by a first gas inlet 48 in communication with a first gas inlet valve 50 and with inert gas system 11 of FIG. 1, as well as by a first gas vent valve 56 in communication with the first gas vent 53 and off-gas treatment system 7 of FIG. 1. Preferably also provided are a second gas inlet 52 in communication with a second gas inlet valve 54 and with inert gas system 11 of FIG. 1 and a second gas vent valve 60 in communication with the second gas vent 57 and with off-gas system 7 of FIG. 1.

In this embodiment when the first gas inlet valve 50 is at least partially open and first gas vent valve 56 is fully open, the gas introduced into vessel 5, gases generated by the reaction of treatment liquid 41 with residual alkali metal 43 and reaction products suspended in the gases within vessel 5 are exhausted through first gas vent 53 as depicted generally by first gas flow arrow 51.

In this embodiment, when the second gas inlet valve 54 is at least partially open and second gas vent valve 60 is fully open, the gas introduced into vessel 5, gases generated by the reaction of treatment liquid 41 with residual alkali metal 43 and reaction products suspended in the gases within vessel 5 are exhausted through second gas vent 57, as depicted generally by second gas flow arrow 55. Provision is also preferably made for allowing for reversing the flow between first gas inlet 48 and second gas inlet 52 by periodically closing first gas inlet valve 50 and allowing at least some of the gases introduced through second gas inlet 52 to flow towards first gas vent 53, and alternatingly re-opening first gas inlet valve 50 and closing second gas inlet valve 54 and allowing at least some of the gases introduced through first gas inlet 48 to flow towards second gas vent 57.

To provide the benefit of safe operation, the preferred embodiment includes the monitoring vessel pressure indicator 49 and controlling the rate of flow and/or dosing quantity of the treatment liquid 41 so that the pressure exerted by liquids and gases within the vessel do not exceed the design pressure of vessel 5. Similarly the preferred embodiment includes monitoring the vessel temperature indicator 47 and controlling the rate of flow and/or dosing quantity of treatment liquid 41 so that the temperature generated by the treatment reaction does not exceed the design temperature of vessel 5.

FIGS. 3B Through 3G

With reference to FIG. 3B through FIG. 3G, depiction is provided of a sequence of six stages, representing configurations of the contents of vessel 5 during a second step of the embodiment of the invention for the case where there is a relatively clear treatment path, and after a substantial portion of the residual alkali metal 43 has been reacted as discussed with reference to FIG. 3A. For this embodiment, instrumentation and valving is substantially similar to that depicted in FIG. 3 and utilized substantially in the same manner as discussed regarding FIG. 3; however, for the purposes of clarity said instrumentation and valving is omitted from these figures.

Figures 3B, 3C, 3D, 3E, 3F, 3G:
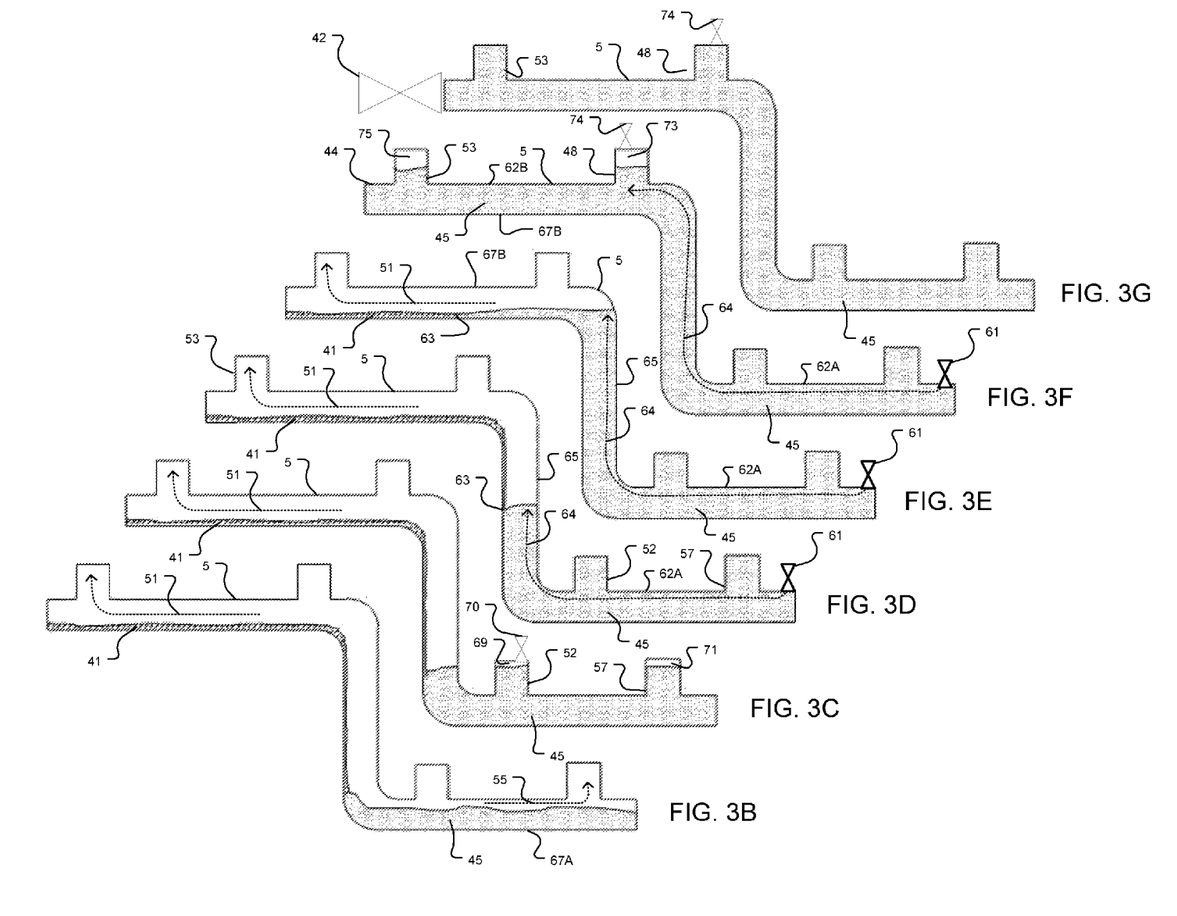
FIGS. 3B-3G depict various stages during a second step of one embodiment of the invention wherein the vessel to be treated has a relatively clear treatment path.

For a first stage of the second step, and referring to FIG. 3B, drain valve 46 (in communication with vessel 5 as shown in FIG. 3A) is turned down or closed and additional treatment liquid 41 is delivered into vessel 5 and reaction product 45 is allowed to accumulate in vessel 5. This accumulation allows additional treatment liquid 41 and/or reaction product 45 to newly contact surfaces to which possible untreated residual alkali metal may still adhere, while still continuing to allow for relatively unrestricted flow of reaction gas as depicted generally by first gas flow arrow 51 and second gas flow arrow 55.

For a second stage and referring to FIG. 3C, further accumulation of liquids (treatment liquid 41, reaction product 45, residual alkali metal 43, other fluids, or a combination thereof) results in liquids preventing the direct flow of gases between the second gas inlet 52 and second gas vent 57. Preferably, during the second stage, second gas inlet valve 54 (FIG. 3A) is closed to stop the flow of inert gas to second gas inlet 52 (FIG. 3A). Preferably, a second headgas vent 70 at the second gas inlet 52 is provided for venting a small gas headspace 69 in second gas inlet 52, in order to allow substantially all unreacted alkali metal on the surfaces of vessel 5 that reside in the vicinity of gas inlet 52 to be treated.

Referring to FIG. 3D and during a third stage, after venting of the small gas headspace 69 from the second headgas vent 70 of the second gas inlet 52 is substantially complete and the second headgas vent 70 is closed, and after venting of a small gas headspace 71 from the second gas vent 57 is substantially complete the second gas vent valve 60 (FIG. 3A) is closed. To more fully treat residual alkali metal adhering to the upper inside surfaces of vessel 5, preferably the gas bubbler valve 61 is opened, and an inert gas is introduced into vessel 5. The inert gas flows along a flow path as generally depicted by gas bubble path 64 and the motion and buoyancy of the gas bubbles aids in stirring the liquids near any residual alkali metal remaining on a first upper surface 62A located in the lower section 67A. As treatment liquid 41 continues to be added to vessel 5, the reaction zone where treatment of alkali metal occurs becomes primarily located near the interface 63 between the treatment liquid 41 and the reaction product 45. The reaction zone and interface 63 gradually move upwards and extend horizontally around the perimeter of vessel 5 as the liquid level moves into a vertical section 65 of vessel 5. Gas introduced along gas flow path 64 combines with the gases flowing as depicted by first gas flow arrow 51, and exits vessel 5 via the first gas vent 53.

During a fourth stage and referring to FIG. 3E, delivery of additional treatment liquid 41 is provided, and the interface 63 enters the upper section 67B of vessel 5. Preferably, inert gas continues to be introduced via gas bubbler valve 61, and continues to flow as generally depicted by gas flow path 64, aiding in removing any residual alkali metal that still resides in vertical section 65.

During a fifth stage and referring to FIG. 3F, interface 63 substantially disappears due to the submersion of vessel inlet 44, first gas inlet 48 and first gas vent 53 are substantially separated from communicating with each other via gas flow (or, if residual alikali metal is present on second upper surface 62B, first gas inlet 48 and first gas vent 53 preferably continues to communicate as bubbles flow along upper section 67B, after which gas flow through first gas inlet 48 is shut-off by closing first gas inlet valve 50 (FIG. 3A)), gas bubbler valve 61 is closed, and a small gas headspace 73 in first gas inlet 48 is vented via a first headgas vent 74, and a small gas headspace 75 in first gas vent 53 is vented.

In stage 6 and referring to FIG. 3G, the first headgas vent 74 is closed after the small headspace in first gas inlet 48 has been exhausted. The first gas vent valve 56 (FIG. 3A) is closed after the small headspace in first gas vent 53 has been exhausted. Simultaneous with or prior to the closing of the last outlet valve through which the treatment liquid and/or gas exit vessel 5, flow of treatment liquid 41 is also stopped by closing liquid inlet valve 42, and vessel 5 is substantially filled and the alkali metal contained therein is substantially reacted.

FIGS. 4A Through 4D

Figures 4A, 4B, 4C:
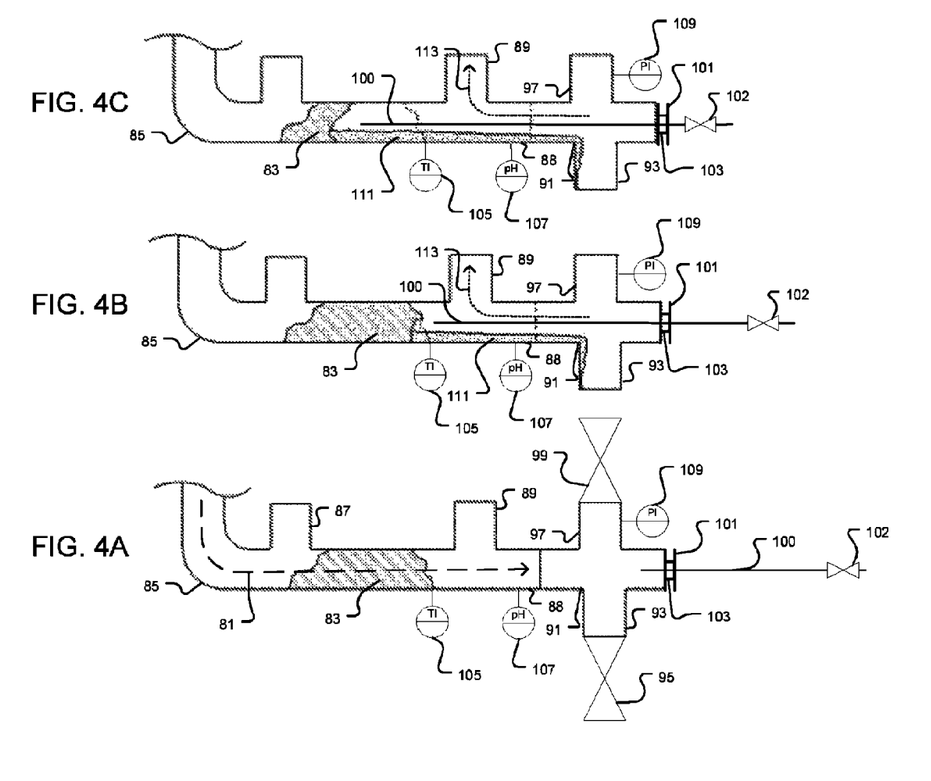
FIGS. 4A-4D depict various stages during an embodiment of the invention wherein the vessel to be treated has a treatment path that is substantially blocked by residual alkali metal.

With reference to FIGS. 4A through 4D, an embodiment of the invention is depicted wherein the treatment flow path is obstructed with untreated alkali metal. In FIG. 4A a vessel 85 is depicted in partial view with similar configuration to the lower part of vessel 5 depicted in FIGS. 3A-3G. Inside vessel 85 a volume of blocking alkali metal 83 is contained that substantially blocks a preferred treatment path as indicated approximately by treatment path arrow 81 of vessel 85. In this embodiment, a vessel outlet 88 is preferably used for reaction product removal from vessel 85 and a vent 89 is preferably used for removal of product/and or inert gas(es) from vessel 85. Also, preferably a temperature indicator 105 near blocking alkali metal 83, a pH indicator 107 near vessel outlet 88, and a pressure indicator near vent 89 are also provided in this embodiment. Conditions that lead to such blockages include, but are not limited to, an uninsulated pipe support removing heat during bulk alkali metal removal from vessel 85, such heat removal causing local freezing of alkali metal that would otherwise freely drain. Means for detecting the presence of such blockages preferably comprise radiographic inspection and/or boroscopic inspection, and may also include but is not limited to ultrasonics and/or gas flow testing. By the preferred means of threaded or flanged connection, but also optionally by means including but not limited to cutting and welding, an attachment 91 is brought into communication with vessel 85 and into communication with liquid disposal system 9 of FIG. 1. Attachment 91 preferably includes an auxiliary liquid drain 93 in communication with an auxiliary drain valve 95 that is also in communication with liquid disposal system 9 of FIG. 1, an auxiliary gas inlet 97 in communication with an auxiliary gas inlet valve 99 that is also in communication with inert gas system 11 of FIG. 1, and a treatment injector 100, which is preferably in communication with and in a positionally adjustable connection 101 to attachment 91. Connection 101 preferably comprises a flange with integral sleeve joint 103, which sleeve joint preferably comprises a compression fitting, which compression fitting preferably provides both the function of slidable adjustment of the position of treatment injector 100 as well as the function of sealing between the outer perimeter of treatment injector and the mating interior circumference of sleeve joint 103. Preferably, treatment injector 100 is also provided with flexible means (not depicted) of communication with neutralizer dosing system 3 of FIG. 1, and also provided with a shutoff valve 102 for the purpose of isolating vessel 5 from neutralizer dosing system 3 of FIG. 1.

Figure 5:
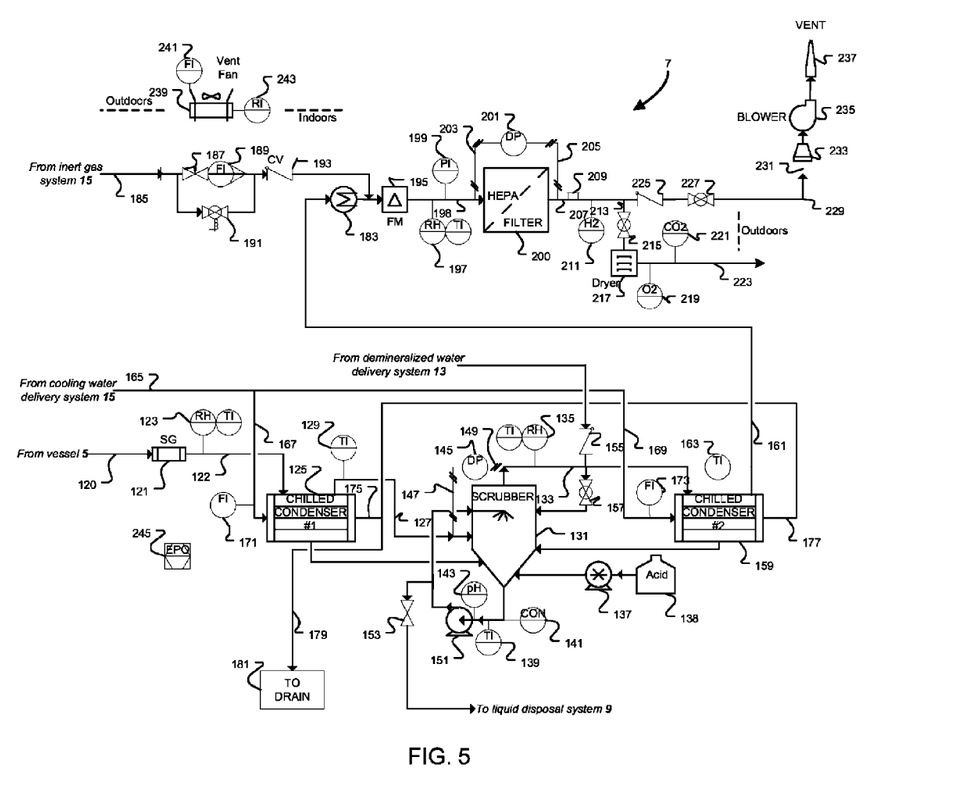
FIG. 5 depicts a preferred embodiment of the off-gas treatment system shown in FIG. 1.

As depicted in FIG. 4B, a first stage of treatment for this embodiment is provided by preferably slidably advancing the treatment injector 100 towards blocking alkali metal 83, tightening the sleeve 103, opening isolation valve 102, and delivering treatment liquid to the surface of blocking alkali metal 83, via preferably a spray or jet nozzle (not shown) near the end of treatment injector 100, utilizing the quantity and flow control provided by liquid dosing system 3 as previously discussed with reference to FIG. 2, and utilizing feedback from temperature indicator 105, pH indicator 107, pressure indicator 109, hydrogen concentration as measured by off-gas treatment system 7 of FIG. 1 as described in more detail with reference to FIG. 5 below, and/or additional feedback parameters as previously discussed.

As depicted in FIG. 4C, a second stage of treatment of this embodiment is provided by preferably slidably advancing and securing treatment injector 100 as described previously, and delivering additional treatment liquid to the surface of blocking alkali metal 83, until enough of the blocking alkali metal 83 has been removed to allow a substantially cleared treatment path approximately depicted by treatment path arrow 81.

Figure 4D:
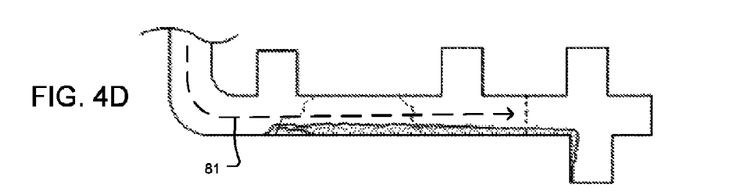

As shown in FIG. 4D, once the blocking alkali metal 83 (shown in FIG. 4A-4C) has been removed, treatment of the remainder of residual alkali metal in vessel 85 preferably proceeds according to the approach previously described for the embodiment of the invention discussed in connection with FIGS. 3A-3G.

FIG. 5

With reference to FIG. 5, an embodiment of off-gas treatment system 7 is depicted for treating the reaction gas vented in vessel exhaust 120 from vessel 5 during treatment. Preferably, off-gas treatment system 7 comprises a scrubber 131 and high efficiency particulate absorbing (HEPA) filter 200. The scrubber 131 preferably provides means for removing from the reaction gas stream caustic and/or other hazardous particles that result from the reaction of the treatment liquid with the residual alkali metal and which become suspended in the reaction gas stream and/or any soluble vapors (including but not limited to, for example, alcohols).

The HEPA filter 200 provides means for removing particulate material down to a very fine particle size, and is preferably included in off-gas system 7 for the embodiment where the residual alkali metal to be treated is radioactive and/or resides in a radioactive environment. Preferably off-gas treatment system 7 further provides means for reducing the temperature of gases vented via vessel exhaust 120, preferably by means of a first chilled condenser 125, for the purposes of sustaining the useful operating life of scrubber 131, for reducing the evaporation rate of solution in scrubber 131, and/or for cooling the reaction gas below the ignition point of any flammable gases (e.g., hydrogen and/or alcohol vapors) contained therein prior to said flammable gases are vented to atmosphere. Additionally, off-gas treatment system 7 further provides means for reducing relative humidity in the reaction gas flowing through vessel exhaust 120, as depicted by preferably providing a second chilled condenser 159 and a gas heater 183, which humidity is deleterious to the effectiveness of HEPA filter 200.

Off-gas treatment system 7 preferably further provides means for measuring hydrogen, oxygen and carbon dioxide as depicted by a hydrogen indicator 211, an oxygen indicator 219, and a carbon dioxide indicator 221, respectively. Hydrogen indicator 211, preferably in conjunction with use of an off-gas exhaust flow meter 195, is preferably used to quantify progress of the reaction of treatment liquid with residual alkali metal. Oxygen level measured by oxygen indicator 219 is preferably maintained by treatment system 1 at or below 1% by volume, in order to stay well below the limits at which, in combination with presence of hydrogen gas, a potentially flammable or explosive condition may result. Carbon dioxide level measured by carbon dioxide indicator 221 is preferably used to indicate the reaction of acid(s) with alkali metal bicarbonate produced by a previous gaseous alkali metal passivation step.

The off-gas treatment system 7 preferably comprises an off-gas inert supply stream 185 to supplement flow of inert gas(es) delivered to vessel 5, preferably metered by means depicted as off-gas inert supply valve 187 in combination with off-gas inert supply flow indicator 189. The supplemental flow of inert gas provides for added assurance that a flow of exhaust gas as indicated by an off-gas exhaust flow indicator 195 does not become negative (i.e., flow towards treatment vessel 5) and/or assurance that the pressure as indicated by off-gas exhaust pressure indicator 199 does not become negative, which negative flow and/or pressure could result in mixing of undesired levels of airborne oxygen with hydrogen and/or other flammable gases conducted within off-gas treatment system 7 or vessel 5.

The off-gas system 7 preferably further provides nitrogen off-gas surge valve 191 for rapid delivery of inert gas at a rapid rate (a preferred embodiment utilizing a solenoid-operated valve in conjunction with an orifice restrictor), the rapid delivery being provided in an embodiment where rapid pressure reductions within off-gas treatment system 7 or within vessel 5 are encountered. Off-gas treatment system also preferably comprises means depicted by an off-gas inert check valve 193 for preventing reverse flow of potentially radioactive or potentially hazardous materials from flowing upstream into off-gas inert supply stream 185.

Off-gas treatment system 7 preferably further comprises one or more instruments and/or equipment as described, depicted as means for providing the following: a sight glass 121 provided for viewing by an operator of treatment system 1 of smoke generated by the reaction of residual alkali metal; an off-gas inlet relative humidity indicator 123, preferably with integrated off-gas inlet temperature indicator 123, provided for quantifying the moisture and/or temperature of first chilled condenser gas feed 122; a scrubber gas feed temperature indicator 129 providing measurement of the temperature of a scrubber gas feed 127 and thereby monitoring effectiveness of first chilled condenser 125; an acid holding tank 138 in combination with an acid dosing pump 137, provided for supplying of an acidic solution for neutralizing caustic reaction product captured in scrubber 131, for maintaining the pH to preferably between 4 and 8 of solution contained within scrubber 131, as measured by a scrubber solution pH indicator 143, and circulated by means of a scrubber recirculation pump 151; a scrubber solution temperature indicator 139 for maintaining the solution contained within scrubber 131 below the temperature limits required for effective operation and longevity of scrubber 131, preferably below 180 degrees Fahrenheit; a scrubber solution conductivity meter 141 for maintaining the total dissolved solids content below the limit that would precipitate solids within scrubber 131, preferably below 50 grams per liter, the conductivity of the solution within scrubber 131 being adjusted by providing fresh water from demineralized water delivery system 13 of FIG. 1 via demineralized water supply check valve 155 and demineralized water supply valve 157, and maintaining total volume of solution within scrubber 131 by periodic opening of a scrubber blow-down valve 153 and discharging solution from scrubber 131 preferably to liquid disposal system 9 of FIG. 1; scrubber gas differential pressure indicator 145 in communication with scrubber gas feed 127 via upstream scrubber tap 147 and in communication with scrubber gas exhaust 133 via downstream scrubber tap 149 for monitoring the possible blocking of gas flow passage through scrubber 133; a scrubber gas exhaust relative humidity indicator 135, preferably with scrubber gas exhaust integrated temperature indicator 135, provided for the quantifying of moisture content and/or temperature of scrubber gas exhaust 133 and thereby the degree of contact of gases fed via scrubber gas feed to scrubber 131; a heater gas feed temperature indicator 163 for quantifying the temperature of heater gas feed 161 and thereby monitoring the effectiveness of second chilled condenser 159; a first condenser flow indicator 171 for measuring flow of cooling water from cooling water delivery system 15 of FIG. 1 via a cooling water supply stream 165 and first condenser coolant feed 167 to first chilled condenser 125; a second condenser flow indicator 173 for measuring flow of cooling water from cooling water delivery system 15 of FIG. 1 via cooling water supply stream 165 and a second condenser coolant feed 169 to second chilled condenser 125; a first condenser coolant discharge 175 for conducting spent cooling water from first chilled condenser 125 to a drain conduit 181 preferably via combined coolant discharge 179; a second condenser coolant discharge 177 for conducting spent cooling water from second chilled condenser 159 to drain conduit 181 preferably via combined coolant discharge 179; an off-gas exhaust relative humidity indicator 197 preferably in conjunction with an off-gas exhaust temperature indicator 197, for monitoring effectiveness of gas heater 183; an off-gas exhaust pressure indicator 199 for monitoring pressure drop via comparison with indication of pressure(s) within vessel 5 and for indication of pressure within off-gas treatment system 7 during pressure testing thereof; HEPA filter differential pressure indicator 201 in communication with HEPA gas feed 198 via HEPA filter upstream tap 203 and in communication with off-gas outlet line 207 via HEPA filter downstream tap 205; off-gas CAM sample port 209 for continuous air monitoring (CAM) of radioactivity for monitoring of the effectiveness of HEPA filter 200; off-gas sample line 213 for the communication of sample gases from off-gas outlet line 207 to off-gas exhaust oxygen indicator 219 and/or off-gas exhaust carbon dioxide indicator 221; an off-gas exhaust sample isolation valve for isolating downstream instruments for maintenance, calibration and/or during pressure testing of off-gas treatment system 7; an off-gas exhaust sample dryer 217 for removing moisture from gases traveling via off-gas sample line 213 and thereby providing protection of downstream instrument(s); an off-gas sample vent 223 preferably in communication with the outdoors for venting of gases flow through off-gas exhaust sample line 213 along with any flammable gases contained therein; an off-gas exhaust outlet check valve 225 for prevention of back-flow of air and/or other gases into off-gas treatment system 7; an off-gas exhaust outlet isolation valve 227 for isolation and/or pressure testing of off-gas treatment system 7; a blower 235 and a gap 231 between an off-gas outlet termination 229 and blower inlet 233 (having preferably at least twice the cross-sectional area of off-gas outlet termination 229) for entrainment of outside air, mixing of the air with exhaust from off-gas treatment system 7 and thereby reducing the concentration of hydrogen and/or other flammable gas(es), preferably to less than 25% of the lower explosion limit of the hydrogen and/or other flammable gas(es); a blower vent for the discharge of the mixed air and for conducting the exhaust to a safe distance from personnel and/or sources of ignition; a ventilation fan 239 with motor (not shown) in communication with the inside of the building or enclosure (not shown) within which off-gas treatment system 7 is housed for removing hydrogen and/or flammable gas(es) leaking from off-gas treatment system 7; a ventilation fan run indicator 243 for monitoring the motor status of ventilation fan 239; a ventilation fan flow indicator 241 for monitoring the flow status of exhaust from ventilation fan 239; and a control system emergency power off switch 245 for cutting off power to neutralizer delivery pump 25 and water delivery pump 35 in the event of an emergency. As a preferred alternative to the three-fold combination of blower inlet 233, blower 235 and blower vent 237, a pipe or stack (e.g., terminating 25 feet above ground level—not shown) is provided as an extension of termination 229, in communication with a diffuser (e.g., horizontal tee with perforations— not shown) as a means of safely dispersing the off-gas flow to the atmosphere.

Preferred materials of construction for surfaces which contact the treatment liquid and/or reaction product include, for example, type 304 stainless steel, type 316 stainless steel for all temperature ranges described herein, and polypropylene, Teflon, and/or butyl rubber for applications below their respective specified maximum temperatures.

It is to be understood that the above-described arrangements, including but not limited to vessel configurations, pumps, valves, equipment and instrumentation, are only illustrative of the application of the principles of the present invention. Numerous modifications and alternative arrangements may be devised by those skilled in the art without departing from the spirit and scope of the present invention and the appended claims are intended to cover such modifications and arrangements.

All publications and patent documents cited in this application are incorporated by reference in their entirety for all purposes to the same extent as if each individual publication or patent document were so individually denoted.

Any element in a claim that does not explicitly state "means for" performing a specified function, or "step for"

performing a specific function, is not to be interpreted as a "means" or "step" clause as specified in 35 U.S.C. §112, ¶6. In particular, the use of "step of" in the claims herein is not intended to invoke the provisions of 35 U.S.C. §112, ¶6.

The embodiment of the invention in which an exclusive property or privilege is claimed is defined as follows:

1. A method for the controllable dissolution of alkali metal comprising:
   a. providing a vessel comprising an alkali metal;
   b. delivering a treatment liquid comprising a neutralizer into said vessel, whereby said alkali metal reacts with said treatment liquid producing a reaction product;
   c. continuously moving said delivered treatment liquid;
   d. said neutralizer comprising water and a liquid reactant;
   e. said liquid reactant reactive to said alkali metal producing said reaction product;
   f. said reaction product comprising an alkali metal cation and an anion and has a pH of less than 12.5;
   g. said liquid reactant capable of dissolving said reaction product; and
   h. extracting said reaction product.

2. The method for the controllable dissolution of alkali metal of claim 1 further comprising:
   a. said reaction product having a pH between 2 and 12.5.

3. A method for the controllable dissolution of alkali metal of claim 1 further comprising:
   a. said alkali metal comprises sodium, potassium, or a combination thereof.

4. A method for the controllable dissolution of alkali metal of claim 1 further comprising:
   a. said vessel is an alkali metal cooled nuclear reactor; and
   b. the interior of said vessel comprising fission products.

5. A method for the controllable dissolution of alkali metal of claim 1 further comprising:
   a. said vessel is a sodium or NaK metal cooled nuclear reactor;
   b. said alkali metal is sodium or NaK; and
   c. the interior of said vessel comprising fission products.

6. A method for the controllable dissolution of alkali metal of claim 1 further comprising:
   a. said neutralizer comprising a dissolved buffer.

7. A method for the controllable dissolution of alkali metal of claim 1 further comprising:
   a. said neutralizer comprising a dissolved buffer; and
   b. said dissolved buffer comprising: sulfuric acid and sodium sulfate, acetic acid and sodium acetate, citric acid and sodium citrate, or a combination thereof.

8. A method for the controllable dissolution of alkali metal of claim 1 further comprising:
   a. said neutralizer comprises a citric acid and citric acid-sodium citrate buffer of about 0.5 to 1.5 moles per liter.

9. A method for the controllable dissolution of alkali metal of claim 1 further comprising:
   a. said neutralizer comprises acetic acid and acetic acid-sodium acetate buffer of about 0.6 to 2.0 moles per liter.

10. A method for the controllable dissolution of alkali metal of claim 1 further comprising:
    a. said neutralizer comprising water and an aliphatic alcohol.

11. A method for the controllable dissolution of alkali metal of claim 1 further comprising:
    a. mixing water and a neutralizer into said treatment liquid; and
    b. said part of delivering a treatment liquid comprising delivering said mixed treatment liquid.

12. A method for the controllable dissolution of alkali metal of claim 1 further comprising:
    a. said treatment liquid comprising acetic acid.

13. A method for the controllable dissolution of alkali metal of claim 1 further comprising:
    a. maintaining said vessel at about ambient temperature and about ambient pressure.

14. The method for the controllable dissolution of alkali metal of claim 1 further comprising:
    a. cooling one or more gases from said reaction product.

15. A method for the controllable dissolution of alkali metal of claim 1 further comprising:
    a. said part of delivering a treatment liquid comprising a neutralizer into said vessel comprising delivering a treatment liquid comprising delivering a neutralizer into a lower section of said vessel at least until said lower section has been substantially filled with said treatment liquid;
    b. venting gases generated by said reaction through one or more vents of said vessel; and
    c. closing said one or more vents after said part of venting gases.

16. A method for the controllable dissolution of alkali metal of claim 15 further comprising:
    a. delivering an inert gas to said lower section of said vessel after said part of delivering said treatment liquid.

17. A method for the controllable dissolution of alkali metal of claim 2 further comprising:
    a. said vessel is a sodium or NaK metal cooled nuclear reactor;
    b. said alkali metal is sodium or NaK;
    c. the interior of said vessel comprising fission products.
    d. said neutralizer comprising water and a liquid reactant; and
    e. maintaining said vessel at about ambient temperature and about ambient pressure.

18. A method for the controllable dissolution of alkali metal of claim 17 further comprising:
    a. said neutralizer comprising a dissolved buffer;
    b. said dissolved buffer comprising: (sulfuric acid and sodium sulfate), (acetic acid and sodium acetate), (citric acid and sodium citrate), or a combination thereof; and
    c. said liquid reactant comprising (sulfuric acid and sodium sulfate), (acetic acid and sodium acetate), (citric acid and sodium citrate), or combinations thereof.

19. A method for the controllable dissolution of alkali metal of claim 17 further comprising:
    a. said treatment liquid comprising citric acid.

20. A method for the controllable dissolution of alkali metal of claim 19 further comprising:
    a. said part of delivering a treatment liquid comprising a neutralizer into said vessel comprising delivering a treatment liquid comprising delivering a neutralizer into a lower section of said vessel at least until said lower section has been substantially filled with said treatment liquid;
    b. venting gases generated by said reaction through one or more vents of said vessel;
    c. closing said one or more vents after said part of venting gases; and
    d. delivering an inert gas to said lower section of said vessel after said part of delivering said treatment liquid.

* * * * *